P. McCOSKER.
Clamps for Securing Advertising Boxes to Lamp and other Posts.
No. 143,365. Patented September 30, 1873.
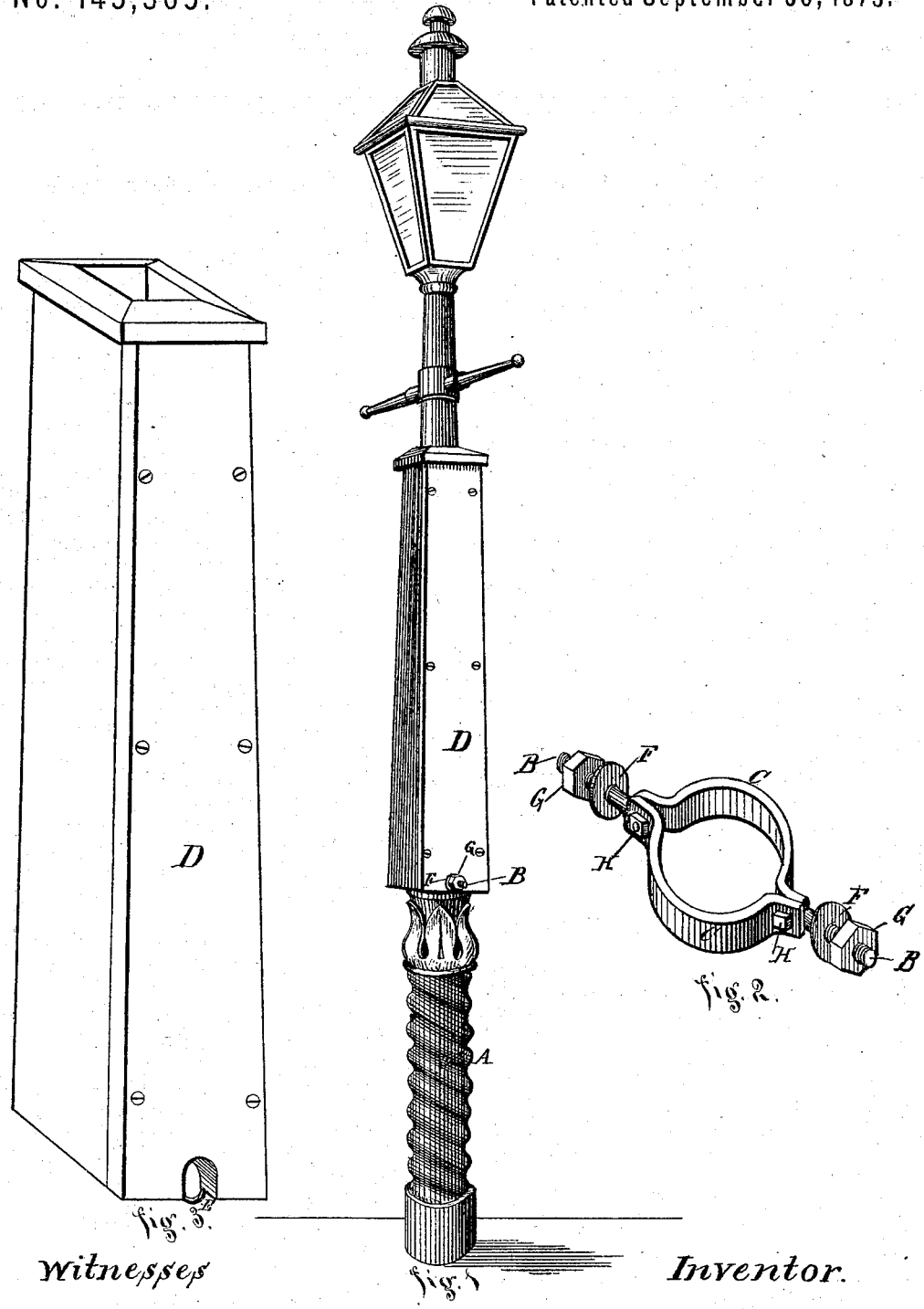
Witnesses
W. K. Jennings
R. G. Pollock
Inventor
P. McCosker

UNITED STATES PATENT OFFICE.

PETER McCOSKER, OF PITTSBURG, PENNSYLVANIA, ASSIGNOR OF ONE-HALF HIS RIGHT TO HENRY SCHMIDT, OF SAME PLACE.

IMPROVEMENT IN CLAMPS FOR SECURING ADVERTISING-BOXES TO LAMP AND OTHER POSTS.

Specification forming part of Letters Patent No. 143,365, dated September 30, 1873; application filed January 17, 1872.

*To all whom it may concern:*

Be it known that I, PETER McCOSKER, of Pittsburg, in the county of Allegheny and State of Pennsylvania, have invented an Improved Clamp for Securing Advertising-Boxes to Lamp and other Posts; and I do hereby declare that the following is a full, clear, and exact description of the same, reference being had to the accompanying drawings forming a part of this specification, in which—

Figure 1 is a perspective representation of a lamp-post to which is secured an advertising-box by means of my improved clamp. Fig. 2 is a perspective representation of the clamp; and Fig. 3 is a perspective representation of an advertising-box specially adapted to use in connection with said clamp.

This invention has relation to devices for supporting advertising-boxes at any desirable height upon lamp or other posts; and consists essentially of an adjustable clamp, having arms to support the advertising-box, and so constructed otherwise, as hereinafter more fully described, that it may be secured to posts of different diameters, and at different heights thereon, and may be removed from a post without injury.

Referring to the accompanying drawings, A designates a lamp-post, and B B the arms of the clamp, which arms proceed from opposite sides, and respectively from separate sections of the clamp, which is constructed in two parts, comprising each a semicircular bar, C, having lips or lugs $c\ c'$ at opposite sides of its diameter, each section being provided with a threaded arm adapted to receive a nut, G, and washer F, as shown clearly in Fig. 2. The two sections of the clamp are secured together by means of bolts H passed through corresponding holes in the lugs $c\ c'$, and furnished with nuts to hold them in place. The clamp when attached to a post embraces the same, the sections being placed in position separately and secured together, as above indicated. The sections may, by means of the bolts H, be adjusted to fit posts of different diameters, or arranged at any required height upon posts of tapering form. After the clamp is applied to the post, the advertising-box D is adjusted to its proper position. This box I construct preferably of a rectangular pyramidal form, with one side removable, and at the lower end, on opposite sides, I form notches E', as shown in Fig. 3, which will include the arms of the clamp when the box is lowered thereon, and prevent the lateral movement or displacement of said box. When the box is in position, staples E are driven up into the ends of the notched sides below the arms of the clamp, which will prevent the box from being lifted and accidentally displaced from the clamp. Finally, the washers F and nuts G are put on the clamp-arms outside the box and tightened, so as to hold the latter rigidly in place.

The arms of the clamp are arranged at the ends of the separate sections, instead of proceeding from one section of the clamp, with the special object of providing an even support to the box, whether said sections are adjusted closely together or at a considerable distance apart.

Having fully described my invention, what I claim as new, and desire to secure by Letters Patent, is—

In combination with the box or advertising medium D applied to a post, substantially as shown and described, the supporting-clamp consisting of the two curved sections C C, united by means of the transverse bolts H H, said sections having each a threaded arm, B, projecting, respectively, from opposite sides of the clamp and holding the nuts G, substantially as and for the purpose specified.

P. McCOSKER.

Witnesses:
W. K. JENNINGS,
R. G. POLLOCK.